Feb. 24, 1970 E. F. MEYERS ET AL 3,497,797

TEST SYSTEM FOR MAGNETIC STORAGE ARRAYS INCLUDING PLURAL SAMPLING MEANS FOR SAMPLING AN OUTPUT SIGNAL AT DIFFERENT TIMES

Filed Nov. 15, 1967 4 Sheets-Sheet 1

INVENTORS
EDWARD F. MEYERS
LEONARD J. STENBERG

BY
Norman R. Bardales
ATTORNEY

Feb. 24, 1970 E. F. MEYERS ET AL 3,497,797

TEST SYSTEM FOR MAGNETIC STORAGE ARRAYS INCLUDING PLURAL SAMPLING MEANS FOR SAMPLING AN OUTPUT SIGNAL AT DIFFERENT TIMES

Filed Nov. 15, 1967 4 Sheets-Sheet 2

Feb. 24, 1970 E. F. MEYERS ET AL 3,497,797

TEST SYSTEM FOR MAGNETIC STORAGE ARRAYS INCLUDING PLURAL SAMPLING MEANS FOR SAMPLING AN OUTPUT SIGNAL AT DIFFERENT TIMES

Filed Nov. 15, 1967 4 Sheets-Sheet 3

Feb. 24, 1970 E. F. MEYERS ET AL 3,497,797

TEST SYSTEM FOR MAGNETIC STORAGE ARRAYS INCLUDING
PLURAL SAMPLING MEANS FOR SAMPLING AN
OUTPUT SIGNAL AT DIFFERENT TIMES

Filed Nov. 15, 1967 4 Sheets-Sheet 4

United States Patent Office 3,497,797
Patented Feb. 24, 1970

3,497,797

TEST SYSTEM FOR MAGNETIC STORAGE ARRAYS INCLUDING PLURAL SAMPLING MEANS FOR SAMPLING AN OUTPUT SIGNAL AT DIFFERENT TIMES

Edward F. Meyers, Owego, and Leonard J. Stenberg, Elmira, N.Y., assignors to International Business Machines Corporation, Armonk, N.Y., a corporation of New York Filed Nov. 15, 1967, Ser. No. 683,366
Int. Cl. G01r 33/00
U.S. Cl. 324—34 18 Claims

ABSTRACT OF THE DISCLOSURE

A test system for testing the waveshape characteristic of the output signals of the magnetic storage elements of a magnetic storage array. Each output signal is sampled on a real time basis by plural sampling channels employed by the test system. Each sampling channel samples a mutually exclusive different part of the output signal.

BACKGROUND OF THE INVENTION

This invention relates to a test system and more particularly to test systems for testing the waveshape characteristic of the output signals of the magnetic storage elements of a magnetic storage array.

Heretofore, it has been suggested to test the waveshape characteristic of the output signal of a magnetic storage element with a single sampling channel which takes a single sample from each of the recurring output signals of the magnetic storage element under test. Each of the samplings occurs at a mutually exclusive different part of the output signal cycle. The different samples are collectively recombined into an "equivalent" output signal which outlines the waveshape characteristic. However, the disadvantage of such a system is that the respective waveshapes of the recurring output signals are generally non-identical due to such influences, for example, as the change in the magnetic history of the storage element which it undergoes with each recurring signal. Thus, the composite or equivalent output signal may not truly represent the waveform characteristic of any particular output signal.

It has also been suggested that the single sampling channel be utilized to provide plural samples of a single output signal so as to provide sampling on a real time basis. However, the disadvantage of this system is that it is limited to an output signal having relatively wide or long durations. In the present state of the magnetic storage art wherein the output signals are of a relatively short duration, the sampling unit is generally unable to take more than one sample from the output signal. Thus, neither of these systems are compatible to the quality and/or quantity testing of a magnetic storage array on a mass production basis.

SUMMARY OF THE INVENTION

It is an object of this invention to provide a test system for testing the waveshape characteristic of an output signal and magnetic storage element on a real time basis.

It is another object of this invention to provide a test system of an aforedescribed type which selectively tests the magnetic core elements of the array.

It is still another object of this invention to provide a test system of the aforementioned kind which is capable of testing the magnetic storage array at the component or element, plane, and/or composite levels.

It is still another object of this invention to provide a test system of the aforementioned kind which is controlled by a data processor and/or which provides the information pertaining to the waveshape characteristic of the particular output signals in digital form for processing by the data processor.

According to the invention, there is provided a test system for testing the waveshape characteristic of an output signal of at least one magnetic storage element of a magnetic storage array. The array has selection line means and sense line means which link the magnetic storage elements. The magnetic storage elements are settable to either of two magnetic states which represent the binary information bits "1" and "0," respectively. The test system provides inter alia means for selectively addressing the magnetic storage elements of the array. It is coupled to the selection line means and provides first address signals that set the particular storage element to at least one of the two magnetic states. It also provides second address signals for testing the particular magnetic storage element. In response to the second address signals, the output signal appears in the sense line means. A plurality of sampling means are coupled to the sense line means and sampling the output signal. Means for actuating the plurality of sampling means cause the latter to sample the output signal at mutually exclusive different times. The samples provided by the plurality of sampling means occur in a real time basis and are proportional to the instantaneous waveshape of the output signal.

The foregoing and other objects, features and advantages of the invention will be apparent from the following more particular description of the preferred embodiments of the invention, as illustrated in the accompanying drawing.

BRIEF DESCRIPTION OF THE DRAWING

In the figures, like elements are designated with similar reference numerals.

DESCRIPTION OF THE PREFERRED EMBODIMENT

Figure 1A:
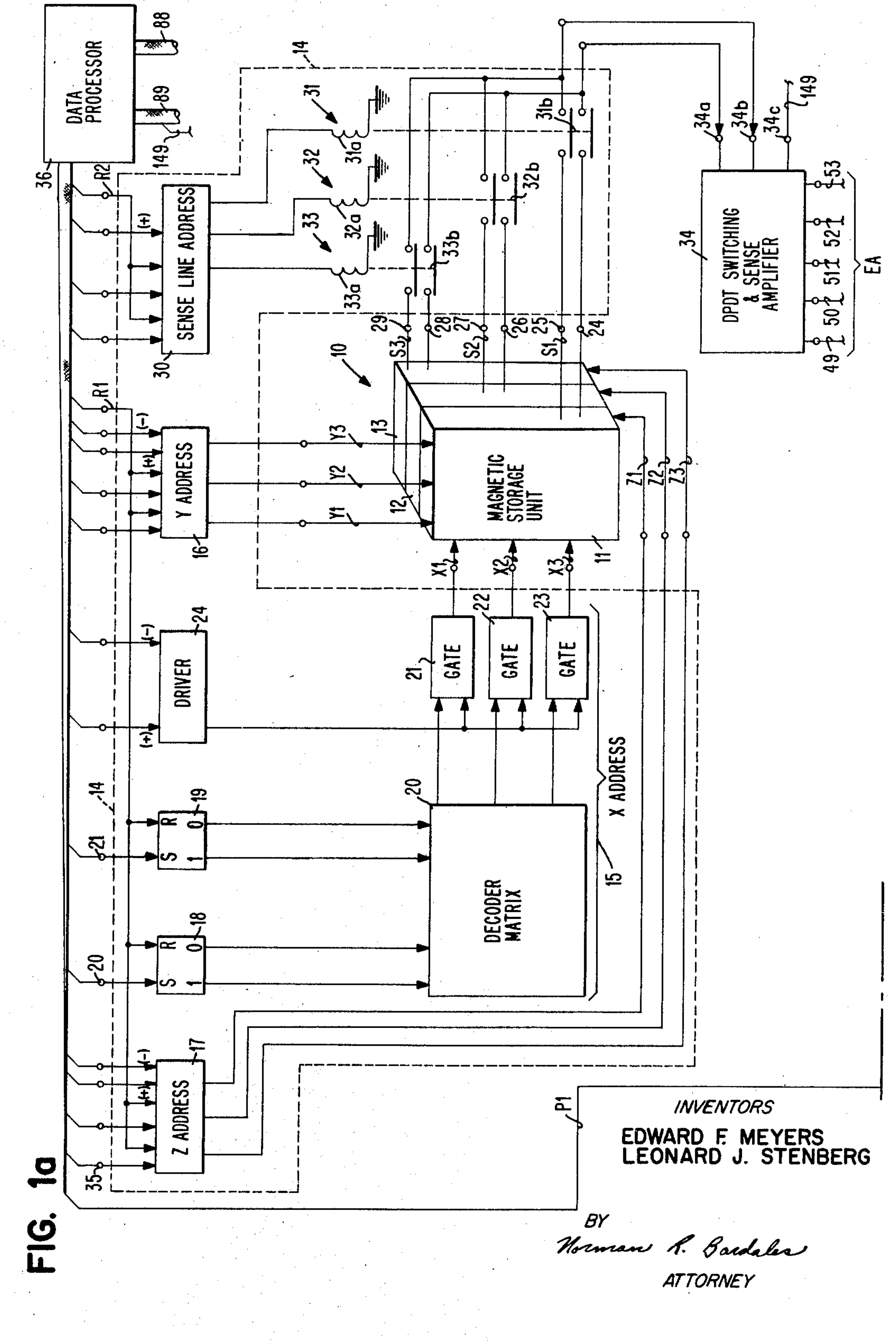
FIGS. 1*a*–1*b* is a schematic view of the preferred embodiment of the invention.
Figure 1B:
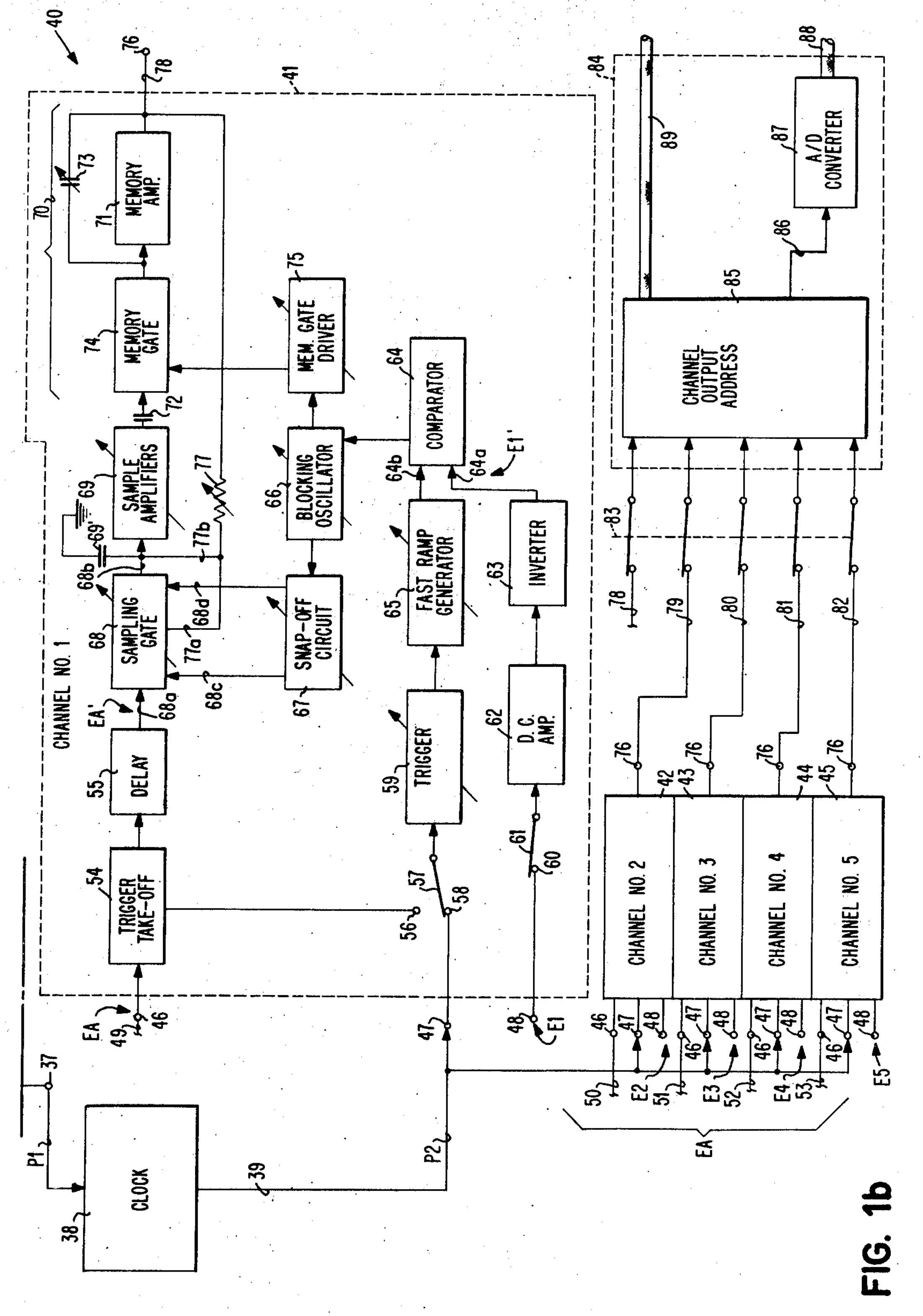

Referring to FIGS. 1*a*–1*b*, block 10 represents a magnetic storage unit which is to be tested by the test system of the preferred embodiment of the present invention illustrated therein. While it is clear that unit 10 can be of any storage element type and consist of any practical number of storage elements and planes, for purposes of explanation the unit 10 is described as consisting of twenty-seven core type elements, not shown, configured in a three dimensional array of three 3 x 3 planes 11, 12, 13.

An addressing system, shown generally in the dash line block 14, addresses the storage elements of unit 10 during testing. It includes for this purpose *x*, *y* and *z* addressing subsystems 15, 16, 17, respectively. For sake of clarity, only subsystem 15 is shown in detail in FIG. 1*a*, it being understood that subsystems 16 and 17 have corresponding similar constituent elements. Accordingly, the *x* subsystem 15 includes a suitable register, shown by way of example as having two flip flop circuit stages 18, 19, for storing the binary coded *x* coordinate address information. A decoder matrix circuit 20, which may be of the diode type for example, in turn enables one of the inputs of the driver gate circuits 21, 22, 23 in response to the information stored in the register. A bipolar current driver 24 is commonly connected to the other inputs of each of the gate circuits 21–23. A set of selection lines X1, X2, X3 of unit 10 has each of its selection lines connected exclusively to one of the respective outputs of gate circuits 21–23. It is to be understood that selection line X1 serially links the storage elements of the first horizontal rows of planes 11, 12, 13; selection line X2 serially links the storage elements of the second horizontal rows of these planes; etc. Similarly, with regards to the *y* addressing subsystem 16, each of its associated gate circuits, not shown, is connected exclusively to one line of the set of selection lines Y1, Y2, Y3 of unit 10. Again, it is to be understood that selection line Y1 serially links the storage elements of the first vertical columns of the planes 11, 12, 13; selection line Y2 serially links the storage elements of the second vertical columns of these planes; etc. With respect to the *z* addressing subsystem 17, each of its associated gate circuits, not shown, is also exclusively connected to one line of the set of selection lines Z1, Z2, Z3 of unit 10. For the *z* set of selection lines of unit 10, it is to be understood that selection line Z1 serially links all the cores of the first plane 11: selection lines Z2 serially links all cores of the second plane 12; etc.

Addressing systems of the previously described kind and their constituent elements are generally known in the art. For example, further information regarding such systems and their implementation is readily available in the literature cf., "Digital Computer Fundamentals" by Thomas C. Bartee, McGraw-Hill Book Co., 1960.

By way of example only, addressing system 14 uses a half current selection technique for addressing the unit 10 in what is referred to in the art as a Two-Coordinate-Read, Three-Coordinate-Write system. Briefly, in such a system during the write operation, when a binary "1" is to be written into a particular core, the *x* and *y* selection lines linking the core are energized with half select currents of the same preselected polarity. If, however, it is desired to write a binary "0" in the core, then in addition to the aforementioned energization of the *x* and *y* selection lines of the cores, the *z* selection line linking the core is energized with a half select current of opposite polarity. During the read operation, only the *x* and *y* selection lines of the core are energized with half selection currents of the same polarity which is opposite to the aforementioned preselected polarity associated with the write operation.

In actual practice, system 14 is implemented for a practical maximum selection line handling capacity in each of the *x*, *y* and *z* dimensions. For example, the two flip flop stages 18, 19 of the *x* register, assuming that the binary number 00 appearing at its output indicates that the register is in a clear condition, can store the three binary numbers 01, 10, 11. These numbers represent the decimal numbers 1, 2, 3 and correspond to the storage locations associated with the selection lines X1, X2, X3, respectively. Under these circumstances, the *x* selection line handling capacity of system 14 is three. Adding one more flip flop circuit stage to the two stage *x* register 18–19 increases its storage capacity by four more binary numbers, to wit: 100, 101, 110, 111. Under these circumstances, if four additional gate circuits are added and the decoder matrix circuit 20 modified accordingly, subsystem 15 would have a selection line handling capacity for seven *x* selection lines X1–X7. By adding two more flip flop stages to the two stage register 18–19, and providing the necessary modifications to the decoder matrix 20 and additional gate circuits therein, the *x* addressing subsystem 15 would provide a selection line handling capacity for fifteen selection lines X1–X15. In those cases where the number of lines of a given selection line set of the storage unit to be tested was less than the selection line handling capacity of the corresponding selection subsystem of the system 14, connection of that particular set of selection lines of the storage unit is only made to a corresponding same number of gate circuits of the particular subsystem. If, on the other hand, the number of lines of a particular selection line set exceeded that of the corresponding selection line handling capacity of the system 14, then the particular set of selection lines would be arranged in two or more groups each containing a number of selection lines compatible to the corresponding selection line handling capacity of the system 14. Each group would be selectively connected to the appropriate number of gates of the corresponding addressing subsystem and the storage unit 10 tested on a sectorized basis.

The storage unit 10 also includes a set of sense lines S1, S2, S3 which are associated with the planes 11, 12, 13, respectively. More particularly, sense line S1 serially links all the core elements of plane 11 and its ends are connected to the output terminals 24 and 25, respectively. Similarly, sense line S2 serially links all the core elements of plane 12 and its ends are connected to the output terminals 26, 27, respectively; and sense line S3 serially links all the core elements of plane 13 and its ends are connected to terminals 28, 29, respectively. To read out the storage unit 10, a sense line addressing subsystem 30 is included in the addressing system 14. Subsystem 30 selectively actuates the normally opened relays 31, 32, 33 which are adapted to connect sense lines S1, S2, S3, respectively, to the electronic double pole double throw switching and sense amplifier network 34, hereinafter described in greater detail. Subsystem 30 is configured similarly to the subsystems 15–17 and in practice has a sense line handling capacity which is equivalent to that of the *z* selection line handling capacity of the system 14. Subsystem 30 accordingly has a sense line register, not shown, in which the binary coded sense line information is stored. This register is connected to a decoder matrix circuit, not shown, which selectively enables the inputs of the associated gate circuits, not shown, of the subsystem 30. The other inputs of these gate circuits are connected to a current driver, not shown, of the subsystem 30 which is of the unipolar, e.g. positive, type. When a particular gate circuit of subsystem 30 is closed, it connects this current driver to an exclusive one of the relay windings 31*a*, 32*a*, 33*a*. The selected winding is thereby energized causing its associated normally open armature 31*b*, 32*b*, or 33*b* as the case might be to connect one of the sense lines S1, S2, or S3 across the input terminals 34*a*, 34*b* of the sense amplifier of network 34.

Control signals for controlling system 14 are applied to its input terminals, e.g. terminal 35. The addressing system is preferably under the control of a data processor system such as a general purpose computer 36 but as is apparent to those skilled in the art, the system 14 may be controlled alone or in combination with other types of control means such as, for example, independent signal generators which may be manually or automatically selectively operated. In the preferred embodiment, data processor 36 provides the binary coded *x*, *y* and *z* information signals during the write operation and the *x*, *y* and sense winding information signals during the read operation, as well as the reset signals R1 and R2 for resetting the registers of the subsystems 15–17 and the register of the subsystem 30, respectively. In addition, the data processor 36 provides a basic synchronization pulse train signal P1 which is fed to the input 37 of the clock 38, the latter providing at its output 39 clock signal pulses during the read operation for the sampling circuit shown generally by the reference character 40, as is next hereinafter to be described. Also provided by the data processor 36 are appropriate actuating signals, e.g. signal (+), for the respective drivers of subsystems 15–17, 30.

The sampling circuit 40, cf. FIG. 1*b*, comprises plural, e.g. five, sampling channels 41–45. In an actual test system constructed in accordance with the principles of the present invention, identical commercial available sampling units of a type known as the Type 1S1 Sampling Unit were used for the individual channels. This particular type of commercial unit was heretofore employed as a combination vertical-and horizontal-deflection plug-in unit for certain types of oscilloscopes which were used for viewing high frequency or fast rise repetitive waveforms. The commercial unit used for its primary mode of operation an equivalent time sampling technique wherein it took a series of samples from a repetitive or recurring signal. The samplings occurred at progressively different times or parts of the signal period and the resultant samples were reconstructed into an "equivalent" waveform of the recurring signal for viewing on a CRT display. The commercial unit could alternatively also be operated with a real time sampling technique wherein the samples were taken continuously along the signal. The samplings occurred periodically and the resultant samples displayed in a series of dots on the CRT screen that followed the actual shape of the signal. However, the commercial unit when operated with this real time sampling technique was limited to sampling very low frequency signals (DC to 5 kc.). In the test system of the present invention, a plural number of these sampling units are configured in a novel combination and manner to coact on a real time basis for sampling signals which are in excess of 5 kc., as well as signals in the DC to 5 kc. range, to test the storage element of unit 10. Thus, for purposes of explanation, each of the identical channels 41–45, hereinafter sometimes referred to as channel No. 1, channel No. 2, etc., is shown in FIG. 1*b* as being configured as one of the aforementioned commercial type units. For sake of explanation, the circuit schematic of the components of only the first channel 41 is illustrated in block form in FIG. 1*b*, and with only that detail which is required to understand its operative and interconnecting relationships with the other circuit elements of the preferred embodiment of the present invention and/or relationship to the circuitry of the aforementioned commerical unit. It is to be understood that the other channels 42–45 have similar components as those of channel 41. The channel components are generally referred to herein by the terminology designated in the published instruction manual for the aforementioned commercial unit. For a more detailed description of the Type 1S1 Sampling Unit, further reference may be made to this publication, which is entitled "Instruction Manual Type 1S1 Sampling Unit," Textronix, 1965.

Accordingly, each channel includes three input terminals 46, 47, 48 designated in the aforementioned manual as SIGNAL IN, EXT TRIG and EXT HORIZ INPUT, respectively. Each of the SIGNAL IN terminals 46 of channels 41–45 is exclusively connected via one of the conductors 49–53 to one of the output terminals of network 34, FIG. 1*a*. The EXT TRIG terminals 47 are commonly connected to the output 39 of clock 38. The EXT HORIZ INPUT terminals 48 are connected to exclusive reference voltage sources, not shown, which provide reference signals E1–E5 to channels No. 1–5, respectively, hereinafter explained.

Referring now to channel 41 in greater detail, terminal 46 is coupled to the trigger take-off circuit 54 which is provided in the aforementioned commercial unit. Circuit 54 in the commercial unit is a transformer, not shown, and terminal 46 of channel No. 1 is connected by an impedance matching means, not shown, to one end of its input winding, not shown. The other end of the winding is connected to the input of the delay means 55. In the commercial unit, delay means 55 is a delay line. Its purpose is to allow certain triggering action hereinafter explained to commence prior to the taking of a sample of the signal EA from circuit 34. The transformer output winding, not shown, of circuit 54 is connected to a switch contact 56 which is part of a switch 57 designated in the manual as the TRIGGER SOURCE switch. Switch contact 56 is associated with the INT mode position of switch 57 referred to in the manual. However, the commercial unit when employed in the present invention is operated with switch 57 in a closed position with another contact 58, which is associated with the EXT + mode position of switch 57 referred to in the manual. Contact 58 is connected to the EXT TRIG terminal 47 of channel No. 1. Thus, the input of trigger circuit 59 is connected via switch 57 to terminal 47, and circuit 59 is thereby made responsive to the clock signals of clock 38. As is obvious to those skilled in the art, terminals 46 and 47 alternatively may be directly connected via respective suitable impedance matching means, not shown, to the inputs of delay means 55 and trigger circuits 59, respectively. For purposes of clarity, however, the trigger take-off circuit 54 and selective switch 57 are illustrated in FIG. 1*b* in order to conform the schematic illustration therein of channel 41 with the actual circuit of the aforementioned commercial unit. The EXT HORIZ INPUT terminal 48 of channel No. 1 is connected to a switch contact 60 that is part of a switch 61 designated in the manual as the DISPLAY MODE switch. As shown in FIG. 1*b* in the present invention, the switch 61 is set in a closed position with contact 60 and this closed position is associated with the EXT HORIZ mode position of switch 61 referred to in the manual. Switch 61 in this position connects the aforementioned reference voltage source, not shown, at terminal 48 to the input of a DC amplifier 62. In the commercial unit, DC amplifier 62 is configured as an emitter-follower circuit and generally acts as the output stage of a Miller staircase generator, not shown, included in the commercial unit. However, in the present invention only the DC amplifier 62 of the aforementioned staircase generator is utilized. With the DISPLAY MODE switch 61 in the aforementioned EXT HORIZ mode position, the staircase generator is disconnected from the input of the DC amplifier 62 and in the present invention the reference signal E1 from the reference voltage source, not shown, at terminal 48 of channel No. 1 is coupled to the adjustable input bias circuit, not shown, of amplifier 62. The output of amplifier 62, in turn, is connected to the input of an inverter 63. The reference signal at terminal 48, cf. signal E1 of channel No. 1, for example, is thus transmitted as an input signal, e.g. signal E1′ of channel No. 1, of an appropriate magnitude and polarity to the lower input **64*a* of the comparator 64. Again, for purposes of clarity, the switch 61, DC amplifier 62, and inverter 63** and their respective connections are illustrated in FIG. 1*b* so as to conform the schematic illustration therein of the channel 41 with the actual circuit of the aforementioned commercial unit. It should be clear, however, that if desired terminal 48 could be connected to the input of DC amplifier 62. Alternatively, in another case, terminal 48 may be connected directly to the lower input **64*a* of the comparator 64. In the latter case, a reference signal of appropriate polarity and magnitude would be applied to terminal 48**.

The other input of comparator 64, shown as the upper input **64*b*** in FIG. 1*b*, is connected to the output of a fast ramp generator 65 that is actuated by the trigger signal of the circuit 59. The output of comparator 64 is connected to the input of a blocking oscillator 66. When the ramp signal of generator 65 of channel No. 1 reaches a voltage level which is equal to that of the reference input signal E1′, comparator 64 provides an output signal that triggers oscillator 66. In response, circuit 66 of the commercial unit generates a fast first output signal and a slower or later second output signal. These first and second signals actuate the two gate driver circuits 67, 75, respectively, discussed hereinafter.

Driver circuit 67 controls normally open sampling gate 68. In the aforementioned commercial unit, gate circuit 68 is a four-arm balanced-bridge, not shown, of the diode type. In FIG. 1*b*, the four corner connections of the bridge are designated by the reference characters **68*a*–68*d*, with the corner connections 68*a* and 68*b* being one diametric set and the corner connections 68***c* and 68*d* being the other diametric set. Between samplings, the bridge diodes are reversed biased and the gate circuit 68 is open. An adjustable bias means, not shown, sets the reverse bias on the bridge diodes and is designated in the manual as the BRIDGE VOLTS adjustment. In the commercial unit, this bias means includes inter alia an adjustable voltage divider network, not shown, which is coupled to the corner connections 68*c* and 68*d* in a parallel relationship. Delay means 55 is connected to the corner connection 68*a* of the bridge sampling gate 68 and places the delayed input signal EA′ thereat. The other corner connection 68*b* of the bridge is connected to the input of the sample amplifier stages 69 and a feedback loop designated by the reference character 77 which is hereinafter discussed. When the sampling gate 68 closes, a sample of the signal EA′ is taken and if the voltage levels appearing at corner connections 68*a* and 68*b* are not the same, the bridge is unbalanced. Under these circumstances, gate 68 generates a signal which is proportional to their difference. This difference signal is then further processed by the channel as an error-correction signal which in response thereto provides an output signal that is proportional to the level of the delayed signal EA′ at the time it was sampled. A feedback signal is derived from this output signal and then fed back through the loop 77 to establish a voltage level at the corner connection 68*b* which is at the level of the signal EA′ at the time it was sampled. When the next sampling occurs, if the signal EA′ is at the same level as it had in the previous sampling, then the voltage levels at 68*a* and 68*b* will be the same and no difference, i.e. error-correction, signal is generated by the gate circuit 68. On the other hand, if the signal EA′ should be at a different level, then the gate circuit 68 generates a new error-correction signal proportional to this different level. As a result the level of the output signal of the channel unit changes proportionally and the feedback signal provides a voltage level at the corner connection 68*b* which is equal to this different level. Thus, in summary, if the level of the signal EA′ is at the time it is being sampled the same as it was in the previous sampling, no error-correction signal is generated and the output signal remains at the same level. However, when there is a difference, the gate 68 generates a difference signal and the channel processes it as an error-correction signal resulting in the output level of the output signal being changed accordingly. The output signal remains at the new level until such time that a sampling occurs when the level of the signal EA′ is again different, whereupon the cycle repeats itself. The bridge is also provided with an adjustable voltage balancing means, not shown, referred to in the manual as the BRIDGE BAL adjustment. In the commercial unit, this balancing means, not shown, includes inter alia a potentiometer, not shown, which is also coupled to the corner connections 68*c* and 68*d* in a parallel relationship. The potentiometer's arm, not shown, is connected to the aforementioned positive feedback loop 77 by the conductor 77*a*. The balancing of the bridge voltage is adjusted by the aforementioned balancing means, not shown, such that no error-correction signal is produced when a sample is taken and the voltage levels at corners 68*a* and 68*b* are the same.

In the commercial unit, circuit 67 includes inter alia pair of charge-storage diodes, not shown, which are also referred to in the art as snap-off diodes. Consequently, the driver circuit 67 is designated in the manual as a snap-off circuit. This circuit, when actuated, provides push-pull or complementary type driving pulses which are fed to the corner connections 68*c*, 68*d* of the bridge of gate circuit 68 causing the bridge diodes, not shown, to be temporarily forward biased. As a result, sampling gate 68 momentarily closes and the signal EA′ at corner 68*a* is sampled. When the level of the sample is different from the voltage level at corner 68*b*, the difference signal is generated and the charge on the circuit capacitance commences to increase or decrease, depending on whether the level of the sample is greater or smaller than the voltage level at corner 68*b*. This circuit capacitance is associated with the input of the first stage, not shown, of the sample amplifier stages 69 and for purposes of discussion is illustrated schematically in FIG. 1*b* by the capacitor 69′. However, due to the brief duration in which sampling gate circuit 68 is strobed closed by the push-pull driving pulses of circuit 67, the circuit capacitance 69′ does not charge or discharge as the case may be to the full level of the signal sample. In the commercial unit, the circuit capacitance 69′ effectively charges or discharges to approximately 30% of the difference between the voltage levels appearing at corner connections 68*a* and 68*b* at the time the sampling takes place and the commercial unit is designated in this regard as having a 30% sampling efficiency. When the gate circuit 68 reopens, the difference or error-correction signal is then further processed by the sample amplifier stages 69 as aforementioned. The output of the sample amplifier stages 69 is connected to the input of a memory circuit generally indicated by the reference numeral 70.

The memory circuit 70 provides a high-gain operational amplifier 71. Capacitors 72, 73 are the input and negative feedback elements, respectively, of amplifier 71. Coupled between the input capacitor 72, which is located in the output of amplifier stages 69, is a normally open memory gate circuit 74. By the time the error-correction signal is processed to the output of stages 69, memory gate driver 75 in response to the aforementioned second output signal from oscillator 66 momentarily closes gate circuit 74. As a result, the processed error-correction signal from the output of the amplifier stages 69 is sampled by the memory gate 74. Connected to the output of memory amplifier 71 is a respective one of the output terminals 76, which terminal is designated as the VERT OUTPUT terminal in the manual. The aforementioned positive feedback loop 77, which is schematically illustrated in FIG. 1*b* as an adjustable attenuation resistor, connects via conductor 77*b* the output of the memory amplifier to the corner connection 68*b* and consequently to the input of the sample amplifier stages 69. The feedback loop 77, as aforementioned, is also connected to the arm of the aforedescribed voltage balancing potentiometer, not shown, of the bridge sampling gate circuit 68 via conductor 77*a*.

If an error-correction signal is present, it increases or decreases, as the case might be, the quiescent charge on the input capacitor 72. When gate 74 closes, the negative feedback action of the memory amplifier 71 places a charge on the capacitor 73 equal to the input capacitor 72 by the error-correction signal. The memory gate 74 then opens before the error-corrections signal from the sample amplifier stages 69 has ended and the charge is left on the capacitor 73. As a result, an output signal appears at terminal 76 of channel No. 1 which is proportional to the level of the signal EA′ at the time it was sampled.

After gate 74 opens and the error-correction signal at the output of stages 69 has ended, the output of the amplifier stages 69 returns to a quiescent level and the input capacitor 72 returns to its quiescent charge. However, capacitor 73 does not effectively discharge and therefore the output signal's level at terminal 76 remains continuous and the same. If, at the time of the next sampling by the gate 68, the voltage levels at corner connections 68*a* and 68*b* are different, then the resultant error-correction signal causes the charge on the input capacitor 72 to again change in proportion thereto. As a consequence, when gate 74 subsequently closes, the residual charge on the feedback capacitor 73 due to the feedback action of memory amplifier 71 will change to the new level of the charge applied to the input capacitor 72. As a result, the level of the output signal at terminal 76 changes to a new level which is proportional to the level of the input signal EA′ at the time of the instant sampling. Thereafter, when the gate 74 reopens as previously explained the charge on capacitor 72 returns to its quiescent level but the charge on the capacitor remains at the new level and the channel is ready for another sampling. If on the other hand, the voltage levels at the corner connections 68*a* and 68*b* are the same at the time the next sampling is taken by gate 68, then no error-correction signal is generated as aforementioned and as a result the charge on the capacitor 72 remains at its quiescent level. When the memory gate 74 subsequently closes, there is no change in the input to the memory amplifier 71 and the residual charge on the capacitor 73 remains the same. Consequently, the level of the output signal at terminal 76 of channel No. 1 remains the same and the channel is ready for the next sampling.

The feedback signal provided by the positive feedback loop 77 causes the corner connection 68*b* to be placed at a voltage level which is proportional to the output signal of channel No. 1. The loop gain is adjusted such that the voltage level at corner connection 68*b* is the same as the voltage level of the signal EA′ at the time of the previous sampling. Generally, if an error-correction signal is produced by the gate 68, the circuit capacitance 69′ is charged or discharged as the case may be to some level which is dependent on the aforementioned sampling efficiency. After the gate 68 reopens, the feedback signal causes the circuit capacitance 69′ to charge or discharge as the case may be to the full level of the signal EA′ that it had at the time the particular aforementioned previous sampling took place. In order to prevent the charging or discharging action of the capacitor 69′, which is caused by the feedback signal, from generating a false error-correction signal the timing sequence is such that gate 74 has reopened before the feedback voltage effectively begins this charging or discharging action. As a result, by the time of the next sampling by gate 68, the voltage level at corner connection 68*b* is at the same voltage level the signal EA′ had at the previous sampling. On this next sampling, when gate 68 is closed, if the voltage levels at corner connections 68*a* and 68*b* are the same then the charge on the circuit capacitance 69′ remains the same and no error-correction signal is produced as aforementioned. However, if the voltage levels at corner connections 68*a* and 68*b* are different, then the residual charge on the circuit capacitance 69′ is increased or decreased according to the sampling efficiency and a new error-correction signal is generated whereupon the cycle repeats itself. For a further detailed description of the circuit elements of the commercial channel unit and their operation, reference may be made to its aforementioned instructional manual.

In the system of the present invention, the output terminals 76 of channel Nos. 1–5 are connected by the respective conductors 78–82 by a commonly ganged switch 83 to a utilization device generally indicated by the reference number 84. In the preferred embodiment, the utilization device 84 includes a channel output address system 85 which selectively addresses the output terminals 76. Connected to the system 85 via conductor 86 is an analog-to-digital converter 87 which converts the analog signals selected by circuit 85 from channels 41–45 to digital signals. These digital signals are stored and/or analyzed in the data processor 36, FIG. 1*a*, via the multiconductor cable connection 88. Data processor 36 also provides the control signals for the channel output address system via multiconductor cable 89.

Referring now to the waveform and timing diagram illustrated in FIG. 2, the operation of the preferred embodiment of the test system of the present invention shown in FIGS. 1*a*–1*b* will now be explained. Stored in the data processor 36 is a test program which provides appropriate control signals to the addressing system 14 for testing the individual storage elements of the unit 10 in a predetermined sequence. For purposes of discussion, it is assumed that the test program is adapted to test each core element of the unit 10 for a binary "1" and a binary "0" condition in a predetermined sequential manner using the aforementioned Two-Coordinate-Read, Three-Coordinate-Write technique. It is further assumed that all of the core elements of the first plane 11 are first tested in the following sequence, wherein the core elements are designated by their *x* and *y* selection line coordinates, to wit: core elements X1–Y1, X1–Y2, X1–Y3, X2–Y1, X2–Y2, X2–Y3, X3–Y1, X3–Y2, and X3–Y3. Next the cores of the second plane 12 are tested in the same sequence and manner, and finally all the cores of the third plane 13 are tested in this sequence and manner.

For purposes of discussion, it is assumed that the core elements of the unit 10 require coincident negative half select pulses on their respective *x* and *y* selection lines to write a "1" into the particular storage element selected. If a "0" is to be written into the core, then in addition the *z* selection line associated with that core must be coincidently half selected with a positive pulse as previously explained. In order to read out the core, positive coincident pulses half select the *x* and *y* selection lines linking the particular core.

Accordingly, each test cycle of the test program example has a WRITE portion followed by a READ portion. The WRITE portion has a first part, sometimes hereinafter referred to as a clearing part, and a second part during which the particular one of the test bits "1" or "0" is written into the particular core to be tested. During the first or clearing part, the core to be tested is cleared of any previous binary information stored in the core. For this purpose, only the particular *x* and *y* selection lines linking the core under test are energized by half select coincident pulses, sometimes hereinafter referred to as clearing pulses, which are opposite to the polarity required to write a binary "0" in the core. For the particular assumed example of the core elements of unit 10 wherein negative half select coincident pulses are used to write a binary "1," during the clearing part of a test cycle the polarity of the clearing pulses are accordingly positive. The clearing part of the test cycle causes the core to be tested to be reset or to remain in a binary "0" condition depending on its previous magnetic state. The particular *z* selection line linking the core under test is not energized during the clearing part.

In the second part of the WRITE portion of a test cycle only the *x* and *y* selection lines linking the core under test are energized with the appropriate polarity half select coincident pulses if a binary "1" is to be written into the core, or in addition the *z* selection line is energized with an opposite polarity half select coincident pulse if a binary "0" is to be written into the core. Thus, in the given example, the particular *x* and *y* selection lines in the second part of the WRITE portion of a test cycle are energized by negative half select coincident pulses and the *z* selection line, if energized, is energized with a positive half select coincident pulse.

During the READ portion of the test cycle, only the *x* and *y* selection lines linking the core under test are energized with half select coincident pulses of identical polarity and which is of opposite polarity so that associated with the half select coincident pulses used to write a binary "1" in the core. Thus, the half select coincident pulse in the READ portion in the given example are of positive polarity.

Figure 2:
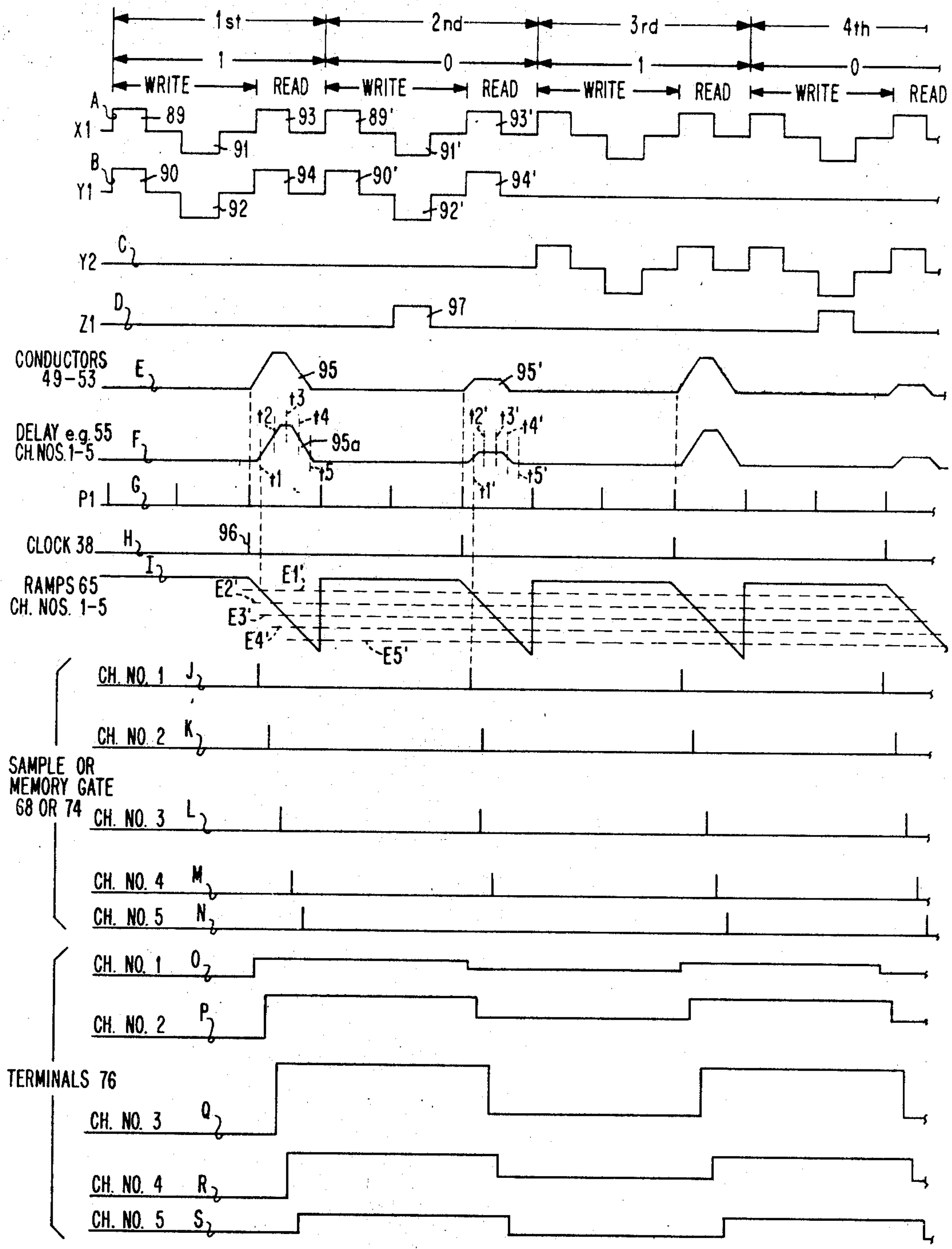
FIG. 2 is a waveform and timing diagram shown in idealized form of certain signals associated with the circuit of FIGS. 1*a*–1*b*.

Accordingly, for the particular test program example and the half select polarity requirements example for the unit 10, at the beginning of the first test cycle 1st, cf. FIG. 2, the respective address registers, e.g. register 18–19, of the subsystems 15–17 are cleared by a short duration reset signal pulses R1 and the binary information corresponding to the sense lines X1, Y1 and Z1 address information is stored in the appropriate registers. As a result, the respective gates, e.g. gate 21, which are connected to these particular selection lines X1, Y1, Z1 are enabled. The data processor 36 also generates positive-control pulse signals (+) for the respective drivers associated with the X and Y addressing subsystems 15, 16 and no control pulse signal for the *z* address driver of subsystem 17. Resultant positive half select coincident pulses 89, 90 energize the respective selection lines X1, Y1, cf. waveforms A and B, respectively, FIG. 2 but line Z1, cf. waveform D, is not energized. Pulses 89, 90 clear the binary information, if any, stored in the core element of the first plane 11, as well as the cores of the other planes 12, 13, which are interconnected by selection lines X1, Y1. The test bit is now ready to be written into the first core to be fed by the test program.

During the second part of the WRITE portion of the first test cycle 1st, the data processor 36 provides negative-control pulse signals (—) to the respective drivers of the X and Y addressing subsystems 15, 16 and no control pulse signal for the *z* address driver of subsystem 17 since a binary "1" test bit is to be written in the first test cycle. The resultant negative half select coincident pulses 91, 92, cf. waveforms A, B, respectively, appear on the selection lines X1, Y1, respectively, causing a binary "1" test bit to be stored in the core elements which are at the intersection of these two selection lines.

During the READ portion of the first test cycle 1st, the data processor 36 provides positive-control pulse signals (+) to the respective drivers of the X and Y addressing subsystems 15, 16. No control pulse signal for the *z* address driver is provided for the reasons previously explained. As a result, positive half select coincident pulses 93, 94 appear on the respective selection lines X1, Y1 causing an output pulse signal to appear in the sense winding S1.

By way of example, at the beginning of the first test cycle 1st, the data processor 36 also provides a control signal R2 which clears the register, not shown, of the sense line addressing subsystem 30 and allows the sense winding address information to be stored in this register. For the particular test program example wherein the cores of the first plane 11 are to be tested first, the sense line address information corresponds to the sense winding S1. The data processor 36 also provides a control signal (+) for the driver of the system 30. For the particular test program being described, the sense winding address information remains in the sense winding address register throughout the testing of the cores of the first plane. Upon the completion of the testing of the core of the first plane 11, the data processor 36 again provides the reset signal R2 and the sense winding address information corresponding to the sense line S2 is stored in the register. Upon the completion of the testing of the cores of the second plane 12, the register is again cleared and the address information corresponding to the sense line S3 is stored therein. By way of example, the control signal for the sense line driver remains up, i.e. present, during the entire testing of the unit 10.

During the first test cycle 1st, the winding 31*a* of relay 31 is thus energized thereby connecting the sense winding S1 to the input terminals 34*a*, 34*b* of network 34. The output signal appearing in the sense winding S1 is processed by the network 34 and appears simultaneously at the respective conductors 49–53 as signal EA. For purposes of simplicity, the coincident output signals at conductors 49–53 are shown by a single waveform E. FIG. 2 and the output pulse associated with the READ portion of the first test cycle 1st is indicated by the reference numeral 95. Similarly, the coincident delayed output signals appearing at the outputs of the respective delay means, e.g. delay means 55 of channel No. 1, of the different channels are shown by a single waveform F, FIG. 2, for purposes of simplicity. The delayed output pulse associated with the READ portion of the first test cycle is indicated by the reference character 95*a*. The timing sequence of the signals P1 provided by data processor 36 is shown by the waveform G in FIG. 2. In response to the basic synchronization signals P1 provided by the data processor 36, the clock 38 provides output pulses which are synchronized with the READ portion of each of the test cycles, cf. waveform H, FIG. 2. The output pulse 96 of clock 38 associated with the READ portion of the first test cycle 1st simultaneously actuates the trigger circuits of the respective channels 41–45, e.g. trigger 59 of channel No. 1, causing the respective ramp generators, e.g. ramp 65, to begin simultaneously their rundown sweeps. It is assumed that the slopes of the respective ramp generators of the different channels 41–45 are the same and accordingly the output signals associated with these ramp generators are illustrated by a single waveform I in FIG. 2 for sake of simplicity. The voltage levels of the reference signals E1–E5 are judiciously selected such that the resultant signals E1′–E5′ derived therefrom are at progressively different levels. Consequently, when the ramp generator of channel No. 1 is at the level E1′, a sampling of the delayed pulse 95*a* occurs at the time indicated by the vertical dash line *t1*. Likewise, when the ramp generator of channel No. 2 is at the level E2′, a sampling of the delayed pulse 95*a* occurs at the time indicated by the vertical dash line *t2*, etc. Thus, five samples are provided for different parts of the single test pulse signal, i.e. delayed pulse 95*a*. Waveforms J–N, FIG. 2, represent the timing sequence of the sample or memory gate driver circuits 68, 74 of the respective channels 41–45. For sake of simplicity, the timing sequence of the sampling gate and memory gate associated with the given channel are illustrated in the waveforms as being in time coincidence. It is to be understood, however, that each memory gate operates subsequently to that of the sampling gate of its particular channel as previously explained. As shown by the waveforms O–S at the respective terminals 76 of channel Nos. 1–5, there are provided analog output signals each of which is proportional to the level of the test pulse signal 95*a* at the time it was sampled by its particular channel. These analog signals are thereafter processed by the utilization device 84 and stored and/or analyzed in the data processor 36 as previously explained.

At the beginning of the second test cycle 2nd, the data processor 36 provides positive-control pulse signals (+) to the *x* and *y* address drivers causing the selection lines X1, Y1 to be half selected with positive coincidence pulses 89′, 90′, cf. waveforms A, B, FIG. 2. These pulses clear the core elements located at the intersection of the selection lines X1, Y1. At the second part of the WRITE portion of the second test cycle, the data processor 36 provides negative-control pulse signals (—) to the X1, Y1 selection windings, cf. waveforms A, B and a positive-control pulse signal (+) to the selection winding Z1 thereby writing a binary "0" test bit into the core located at the intersection of the lines X1, Y1, Z1. The negative half selection pulses and the positive half section pulse appearing on the respective lines X1, Y1, Z1 are indicated by the reference numerals 91′, 92′ and 97. In the READ portion of the second test cycle, the positive-control pulse signals (+) provided by the data processor 36 to the *x* and *y* address drivers causes positive half selection pulses 93′, 94′ to energize the selection windings X1, Y1. As a result, there appears at the conductors 49–53 an output pulse 95′. Again as in the previous test cycle, five samples of the single test pulse signal 95*a′* are provided by the five sampling channels 41–45. As shown for example by waveform O, the level of the output signal appearing at terminal 76 of channel No. 1 changes in proportion to the level of the delayed signal EA′, cf. waveform F, at the time *t1′* it was sampled. The output levels of the output signals indicated by the other waveforms P–S of channel Nos. 2–5, respectively, likewise change in proportion to the level of the signal EA′ at the time the sampling is made by the particular channel.

It can readily be demonstrated that the aforegoing pair of test cycles 1st, 2nd is repeated for each of the core elements to be tested with the data processor 36 providing the appropriate reset, driver control and address information signals as required, cf. test cycles 3rd, 4th, partially shown, and the corresponding half select pulses provided on the X1, Y2, Z1 selection lines for testing the core element intersected at these selection lines which is the next core element to be tested in the given sequence example.

Figure 3:
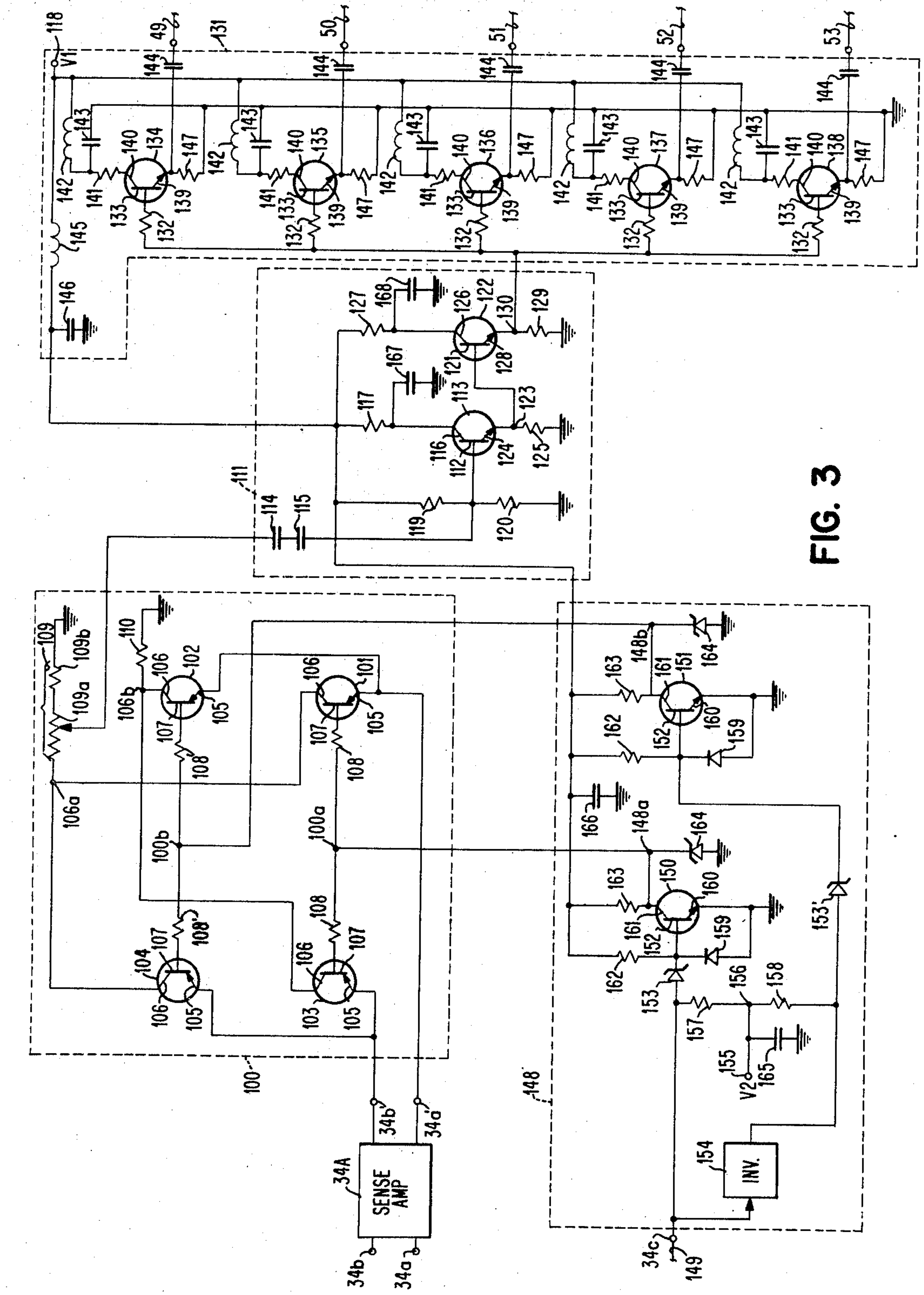
FIG. 3 is a detailed schematic of the double pole double throw electronic switch illustrated in FIG. 1*a*.

As is well known to those skilled in the art, the polarity of the output pulses appearing on the sense lines of the unit 10 is dependent upon the manner and direction in which the *x, y* and *z* selection lines and the sense lines are wound upon, i.e. linked to, the individual cores. In the present invention, the test system is provided with the capability of reading out output signals of both polarity types. For this purpose, the sense amplifier and double pole double throw electronic switching network 34 shown schematically in FIG. 1*a* and illustrated in greater detail in FIG. 3 is provided. With reference to FIG. 3, network 34 includes a sense amplifier 34A which is configured as a differential amplifier having a pair of inputs 34*a*, 34*b*. The switching stage of the double pole double throw electronic switch DPDT of the network 34 is shown generally by the dash line 100. It includes four identical switching transistors 101–104, which are of the PNP type. The emitter electrodes 105 of transistors 101 and 102 are commonly connected to the output terminal 34*a'* of amplifier 34A and the emitter electrodes 105 of transistors 103, 104 are commonly connected to the other output terminal 34*b'*, The collector electrodes 106 of transistors 101 and 104 are commonly connected to the junction 106*a*· Similarly, the respecitve collector electrodes 106 of transistors 102 and 103 are commonly connected to the junction 106*b*. The base electrodes 107 of transistors 101 and 103 are interconnected through the series-connected indentical resistors 108. The base electrodes 107 of transistors 102 and 104 are interconnected through the series-connected identical resistors 108'. Load circuits 109, 110 are connected to the junctions 106*a*, 106*b*, respectively. The load circuit 109 is a voltage divider network which includes the series-connected potentiometer 109*a* and resistor 109*b*. The combined resistance value of the potentiometer 109*a* and 109*b* is substantially equal to the resistance value of the dummy load, i.e. resistor, 110.

The arm of the potentiometer 109*a* is connected to the input of a pair of cascaded emitter follower stages which are part of the DPDT electronic switch of network 34 and which are indicated generally by the reference numeral 111. The base electrode 112 of NPN transistor 113 of the input emitter follower stage is connected through the series-connected coupling capacitors 114, 115 to the arm of the potentiometer 109*a*. The collector electrode 116 is connected through biasing resistor 117 and the LC filter circuit 145–146 to a power supply, not shown, which is connected to the terminal 118 and provides a voltage V1. The power supply, not shown, also biases the base electrode 112 of transistor 113 via the voltage divider network, i.e. resistors 119, 120. The base electrode 121 of NPN transistor 122 of the second emitter follower stage is connected to the junction 123 between the emitter electrode 124 and the grounded emitter resistor 125 of the input emitter follower stage. The collector electrode 126 of transistor 122 is connected through a biasing resistor 127 to the aforementioned power supply, not shown. The emitter electrode 128 of transistor 122 and the grounded emitter resistor 129 are connected to junction 130 which in turn is connected to the output stage which is part of the DPDT electronic switch of network 34 and generally indicated by the reference numeral 131. Statge 131 includes five identical parallel-connected emitter follower circuits next to be described.

Junction 130 is connected via the respective resistors 132 to the base electrodes 133 of NPN transistors 134–138 of the five parallel emitter follower circuits. The emitter electrodes 139 of transistors 134–138 are connected to the conductors 49–53, respectively, via respective coupling capacitors 144. The collector electrodes 140 of the transistors 134–138 are connected to the bias resistors 141. Each bias resistor is connected to the junction of one of the commonly ground LC filter circuits 142–143 that are commonly connected in parallel to the power supply, not shown, at terminal 118. Each of the emitter electrodes 139 are also connected to one of the commonly grounded resistors 147.

The DPDT electronic switch of network 34 has a control stage generally indicated by the reference numeral 148. It is connected to the junctions 100*a* and 100*b* of the switching stage 100. Stage 148 has an input terminal 34*c* at which is provided a suitable conditioning signal as hereinafter explained. In the preferred embodiment the data processor 36 provides this conditioning signal via conductor 149. The input terminal 34*c* is connected to a pair of transistorized channels which include identical transistors 150, 151, respectively, which are of the NPN type. Terminal 34*c* is connected to the base electrode 152 of transistor 150 via the bias Zener diode 153. Terminal 34*c* is also connected to the input of inverter 154. The output of inverter 154 is connected via an identical Zener diode 153' to the base electrode 152 of transistor 151. An input bias supply, not shown, applies a voltage V2 to the terminal 155 which is connected to the junction 156 of the identical biasing resistors 157, 158. The identical rectifier diodes 159 connect the base electrodes 152 of transistors 150, 151 to their respective grounded emitter electrodes 160. The base electrodes 152 and the collector electrodes 161 of the transistors 150 and 151 are connected via resistors 162 and resistors 163, respectively, and through the filter circuit 145–146 to the power supply terminal 118. Junctions 148*a* and 148*b* connect the collector electrodes 161 of transistors 150 and 151, respectively, to the grounded identical clamping Zener diodes 164 and to the terminals 100*a* and 100*b*, respectively. Bypass capacitors 165 and 166 are provided for the terminals 155 and 118, respectively. In stage 111, identical bypass capacitors 167, 168 are connected to the collector electrodes 116, 126 of transistors 113 and 122, respectively.

In operation, in the absence of any signals at the terminals 34*a*, 34*b*, 34*c*, the circuit is in a quiescent condition. Under these circumstances, the transistors 101–104, 150 and 151 are non-conducting. The transistors 113, 122 and 134–138 are biased such that the respective emitter electrodes are at their respective quiescent levels. Due to the presence of the coupling capacitors 144 the output signals present at the conductors 49–52 are at or near a zero level.

For a given type of magnetic storage unit to be tested, its winding configuration is known and consequently the test program instructs the data processor 36 to provide a conditioning signal having a predetermined polarity via the conductor 149 to the terminal 34*c* in accordance with the known polarity type of the output pulse that is generated in the sense line by the particular storage element being tested. In some cases, for a given type of storage unit, the storage elements are linked such that each of the storage elements provides the same polarity type output pulse when being read out. Consequently, in these cases the data processor 36 provides a conditioning signal with an appropriate polarity to the terminal 34*c* at the beginning of the first test cycle 1st and it remains present at terminal 34*c* throughout the entire testing of the magnetic storage unit under test. It should be understood, however, that for storage unit types to be tested wherein the storage elements are so linked by the address and sense windings that the sense line output pulses may be of opposite polarity or both polarity types, then the test program would be modified so that the data processor 36 provides an opposite or bipolar conditioning signal to the terminal 34*c* with the conditioning signal being provided with the appropriate polarity during each test cycle.

For purposes of discussion, it is assumed that the storage unit 10 of FIG. 1*a* provides only unipolar output pulses of a predetermined type in each of the sense windings. Furthermore, it is assumed that this predetermined polarity type of output pulses when sensed by the sense amplifier 34*a* provides positive pulses at the output terminal 34*a'* and a corresponding negative pulse at the terminal 34*b'*. Under these circumstances, at the beginning of the first test cycle 1st, data processor 36 provides a positive conditioning signal to the terminal 34*c*. This causes transistor 150 to conduct. However, due to the conditioning signal's application through the inverter 154, transistor 151 remains in its non-conduction state. The collector output of transistor 150, in turn, causes transistors 101 and 103 to conduct through their respective load circuits 109, 110. Transistors 104 and 106 remain non-conducting. Due to the presence of the coupling capacitors 114 and 115, the conduction of transistor 101 does not affect the subsequent stages 111 and 131 and they remain in their quiescent states. When a positive output pulse appears at the terminal 34*a'*, conduction through the transistors 101 and 103 increases and decreases, respectively. The voltage across the load 109 is detected through the arm of potenitometer 109*a* and the bias on the emitter follower transistor 113 is changed proportionally. In turn this causes the output of the successive emitter follower stage 122 to change proportionally and as a result, the successive parallel emitter follower stages 134–138 generate proportional coincidental output pulses EA.

In those cases in which the storage unit under test provides output pulses of a polarity opposite to that of the aforedescribed example, the resultant sense amplifier output signal provides a positive pulse on the terminal 34*b'* and a negative pulse on the terminal 34*a'*. Data processor 36 then provides a negative conditioning signal at the terminal 34*c*. Under these conditions, in the absence of an output signal at the terminals 34*a'*, 34*b'*, a negative conditioning signal at terminal 34*c* would cause transistor 151 to conduct and transistor 150 to remain non-conducting. As a result, transistors 102, 104 turn on, that is conduct, but the transistors 101 and 103 remain in their non-conduction state. Upon the application of a positive output pulse on the terminal 34*b'*, the conduction through transistor 104 increases whereas that of transistor 102 decreases. The resultant change in the load voltage across the potentiometer 109*a* is detected and processed by the stages 111 and 131 so as to provide proportional output pulses on the conductors 49–53 but which have the same polarity type as the previously described example.

Typical values for the various circuit components of the DPDT electronic stage of circuit 34 are indicated in Table I, as follows:

TABLE I

| | |
|---|---|
| Transistors 101–104 | Type 2N2905, each. |
| Transistors 112, 122, 134, 138 | Type 2N2369, each. |
| Transistors 150, 151 | Type 2N708, each. |
| Diode 159 | Type 1N251. |
| Zener diodes 153, 153' | Type 1N3506, each. |
| Zener diode 164 | Type 1N756. |
| Resistors 108, 108', 119 | 2700 ohms, each. |
| Potentiometer 109*a* | 200 ohms. |
| Resistor 109*b* | 301 Do. |
| Resistor 110 | 499 Do. |
| Resistors 117, 129 | 200 ohms, each. |
| Resistor 120 | 3300 ohms. |
| Resistors 125, 147 | 510 ohms, each. |
| Resistor 127 | 68 ohms. |
| Resistor 132 | 51 Do. |
| Resistor 141 | 43 Do. |
| Resistors 157, 158 | 1000 Do. |
| Resistor 162 | 3900 Do. |

TABLE I.—Continued

| | |
|---|---|
| Resistor 163 | 1800 Do. |
| Capacitors 114, 115, 143, 146 | 27 $\mu$f., each. |
| Capacitor 144 | 10 $\mu$f. |
| Capacitors 166–168 | 0.01 $\mu$f., each. |
| Inductors 142, 145 | 10 $\mu$h., each. |
| V1 | +12 volt. |
| V2 | −6 Do. |

The aforedescribed test system of the present invention is particularly adapted for testing fast rise and short duration pulse signals. By way of example, the aforementioned constructed test system, which employed the aforementioned five commercial sampling units, is capable of testing the rise times of pulses having a rise time of 1 nanosecond and/or a pulse duration of 1 nanosecond.

In the preferred embodiment, each of the sampling channels 41–45 has its own individual trigger 59 and fast ramp generator 65. With this arrangement the test system is capable of providing different slopes of the generated ramp and thus may also be used for adjusting the timing relationship(s) of the particular channel or channels. However, as is obvious to those skilled in the art, the sampling circuit 40 of the present invention may be modified such that a common trigger circuit and fast ramp generator is provided for the sampling channels 41–45 in lieu of the individual ones previously mentioned.

It should also be understood that the test system of the present invention could provide other testing sequences and test patterns. For example, in lieu of testing the magnetic storage unit on a composite basis, that is testing each and every storage element of the array, the system could be modified to test a preselected storage element or storage elements, and/or could be modified to test the storage elements of a preselected plane or planes. Also, the test system could be modified to address magnetic storage units that use other selection techniques such as a full selection, etc. Moreover, in the test system of the preferred embodiment, the address information of the particular core being tested is indexed in the data processor with the resultant digital information corresponding to the waveshape of the output signal and thus provides means for identifying the location of the particular storage element or elements that does not or do not have the desired waveshape characteristic(s).

Thus, while the invention has been particularly shown and described with reference to the preferred embodiments, it will be understood by those skilled in the art that the foregoing and other changes in form and detail may be made therein without departing from the spirit and scope of the invention.

What is claimed is:

1. A test system for testing the waveshape characteristic of an output signal of at least one magnetic storage element of a magnetic storage array having selection line means and sense line means coupled to said magnetic storage element, respectively, said magnetic storage element being settable to either of two magnetic states representing the binary information bits "1" and "0," respectively, said test system comprising:

means for selectively addressing the magnetic storage elements of said array, said means for addressing being coupled to said selection line means and providing first address signals for setting said storage element to at least one of said two magnetic states and providing second address signals for testing said magnetic storage element, said sense line means providing said output signal in response to said second address signals;

a plurality of sampling means coupled to said sense line means for sampling said output signal; and means for actuating said plurality of sampling means to sample said output signal at mutually exclusive different times thereof, said plurality of sampling means providing samples of said output signal proportional to the waveshape of the output signal on a real time basis.

2. A test system according to claim 1 wherein said plurality of sampling means comprises:

an amplifier having input and output means, respectively, said input means being coupled to said sense line means;

a corresponding plurality of normally open gate means commonly coupled to said output means; and wherein said means for actuating further comprises a corresponding plurality of adjustable gate control means, each of said gate control means controlling a mutually exclusive different one of said plurality of gate means, each of said gate control means being adjusted to momentarily close said gate means at one of said different parts of said output signal.

3. A test system according to claim 2 further comprising a double pole double throw switching means for coupling said plurality of normally open gate means commonly to the output means of said amplifier.

4. A test system for testing the waveshape characteristic of the output signals of the magnetic storage elements of a magnetic storage array having selection line means and sense line means coupled to said magnetic storage elements, said magnetic storage elements being settable to either of two magnetic states representing the binary information bits "1" and "0," respectively, said test system comprising:

means for selectively addressing the magnetic storage elements of said array, said means for addressing being coupled to said selection line means and providing first address signals for selectively setting said storage elements to one of said two magnetic states and providing second address signals for testing said magnetic storage elements, said sense line means providing said output signals in response to said second address signals;

a first sense amplifier having first input and first output means, respectively, said first input means being coupled to said sense line means;

a double pole double throw switching circuit having second input and second output means, respectively, said second input means being coupled to said first output means, and said switching circuit providing unipolar output signals at said second output means responsive to said output signals;

a plurality of identical sampling means, said plurality of sampling means having mutually exclusive different third input means coupled to said second output means of said switching circuit; and means for actuating said plurality of sampling means to sample each of said output signals at mutually exclusive different times thereof, said plurality of sampling means further having mutually exclusive different third output means, and said plurality of sampling means providing a corresponding plurality of samples of each of said output signals proportional to the waveshape of the output signal on a real time basis, each of said samples of each of said output signals appearing on a mutually exclusive different one of said third output means.

5. A test system according to claim 4 wherein said sense amplifier comprises a differential amplifier, said first input means of said sense amplifier further having a pair of first and second input terminals and said first output means having a pair of first and second output terminals.

6. A test system according to claim 5 wherein said double pole double throw switching means comprises:

a first stage having first, second, third and fourth switching transistors, each of said transistors having first, second and third controllable electrodes, said first electrodes of said first and second transistors being coupled to the first output terminal of said differential amplifier, said first electrodes of said third and fourth transistors being coupled to the second output terminal, said second electrodes of said first and fourth transistors being commonly connected to a first output impedance, said second electrodes of said second and third transistors being commonly connected to a second output impedance;

a second stage having fourth input means and a pair of fourth output means, said second stage providing a first conditioning signal at one of said fourth output means in response to a first reference signal of a predetermined polarity applied to said fourth input means and said second stage providing a second conditioning signal at the other of said fourth output means in response to a second reference signal of opposite polarity applied to said fourth input means, one of said fourth output means being commonly coupled to said third electrodes of said first and third transistors and the other of said fourth output means being commonly coupled to said third electrodes of said second and fourth transistors; and a third stage having a fifth input means connected to said first output impedance and having a corresponding plurality of fifth output means, said plurality of fifth output means being connected to mutually exclusive different ones of said third input means of said plurality of sampling means.

7. A test system according to claim 5 wherein each of said sampling means comprises:

a first gate circuit coupled to the third input means of the particular corresponding sampling means;

a second gate circuit;

means for serially coupling said first gate circuit to said second gate circuit;

a high gain operational amplifier having an input and output, the input of said high gain amplifier being serially coupled to said second gate circuit, said third output means comprising the output of said high gain amplifier;

a negative first feedback circuit coupled across the input and output of said high gain amplifier;

a second positive feedback circuit coupled from the output of said high gain amplifier to said means for coupling; and said means for actuating providing for each of said sampling means first and second gate driver signals for sequentially actuating the first gate circuit and the second gate circuit, respectively, of the particular sampling means.

8. A test system according to claim 4 further comprising synchronizing means for synchronizing said means for actuating with said second address signals.

9. A test system according to claim 4 wherein each of said sampling means further comprises:

means for maintaining between each preceding sample and the next succeeding sample taken by the particular sampling means the output level appearing at its respective third output means at the level of said preceding sample.

10. A test system according to claim 4 further comprising means for converting said samples into digital signals.

11. A test system according to claim 10 further comprising a data processor for processing said digital signals 12. A test system according to claim 11 wherein said data processor further provides control signals for said addressing means.

13. A test system for testing the waveshape characteristic of the output signals of the magnetic storage elements of a magnetic storage array, said array having selection line means and sense line means coupled to said magnetic storage elements, said magnetic storage elements being settable to either of two magnetic states representing the binary bits "1" and "0," respectively, said test system comprising:

addressing means for selectively addressing the magnetic storage elements of said array, said addressing means being coupled to said selection line means and providing first address signals for selectively setting said storage element to one of said two magnetic states and providing second address signals for testing said magnetic storage elements, said sense line means providing said output signals in response to said second address signals;

a sense amplifier having first input means and first output means, said first input means being coupled to said sense line means;

a double pole double throw semiconductor switching circuit having second input and second output means, respectively, said second input means being coupled to said first output means, and said switching circuit providing unipolar output signals at said second output means responsive to said output signals; and a plurality of identical sampling means, each of said sampling means comprising first gate circuit means having third input means and third output means, delay means coupled to said third input means and said second output means, amplifying means having fourth input means and fourth output means, said fourth input means being connected to said third output means, a second gate circuit means having fifth input means and fifth output means, a high gain operational amplifier having sixth input means and sixth output means, said sixth input means connected to said fifth output means, said fifth input means having an input capacitor associated therewith, a negative first feedback circuit connected between said sixth output means and said sixth input means, a positive second feedback circuit connected between said sixth output means and said third output means, said input capacitor being serially coupled to said fourth output means and said fifth input means, and adjustable actuating means for sequentially actuating said first and second gate circuit means, the respective actuating means of each of said plurality of sampling means being adjusted to actuate said plurality of sampling means to sample each of said output signals at mutually exclusive different times thereof, said plurality of sampling means providing a corresponding plurality of samples of each of said output signals proportional to the waveshape of the output signal on a real time basis, each of said samples of each of said output signals appearing on a mutually exclusive different one of said sixth output means.

14. A test system according to claim 13 further comprising means for converting said samples into digital signals.

15. A test system according to claim 14 further comprising:

synchronizing means for synchronizing said means for actuating with said second address signals; and a digital data processor for processing said digital signals and for providing control signals for said addressing means and said synchronizing means.

16. A test system according to claim 15 wherein:

said sense amplifier is a differential amplifier, said first input means having first and second input terminals, and said first output means having first and second output terminals;

said double pole double throw switching circuit comprises a first stage having first, second, third and fourth switching transistors, each of said transistors having first, second and third controllable electrodes, said first electrode of said first and second transistors being coupled to the first output terminal of said differential amplifier, said first electrodes of said third and fourth transistors being coupled to the second output terminal, said second electrodes of said first and fourth transistors being commonly connected to a first output impedance, said second electrodes of said second and third transistors being commonly connected to a second output impedance;

a second stage having seventh input means and a pair of seventh output means, said second stage providing a first conditioning signal at one of said seventh output means in response to a first reference signal of a predetermined polarity applied to said seventh input means and said second stage providing a second conditioning signal at the other of said seventh output means in response to a second reference signal of opposite polarity applied to said seventh input means, one of said seventh output means being commonly coupled to said third electrodes of said first and third transistors and the other of said seventh output means being commonly coupled to said third electrodes of said second and fourth transistors; and a third stage having an eighth input means connected to said first output impedance and having a corresponding plurality of eighth output means, said plurality of eighth output means being connected to mutually exclusive different ones of said third input means of said plurality of sampling means; and wherein said data processor further provides said first and second reference signals.

17. A test system according to claim 16 wherein said magnetic storage element of said magnetic storage array are arranged in identical plural rectangular matrices and wherein said selection line means has a corresponding number of plural selection lines, each of the selection lines linking all of the core elements of a mutually exclusive different matrix, said test system further providing:

means for selectively connecting said sense lines to said second input means of said switching circuit;

said data processor further providing control signals for controlling said means for selectively connecting the sense lines.

18. A test system according to claim 16 wherein said first feedback circuit includes a feedback storage capacitor.

References Cited

UNITED STATES PATENTS 3,238,449 3/1966 Gordon et al. -------- 324—34

OTHER REFERENCES

Myers et al.: Testing Magnetic Core Planes, I.B.M. Tech. Disc. Bull., vol. 1, No. 2, pp. 21–22, August 1958.

Healey et al.: Core Tester, I.B.M. Tech. Disc. Bull, vol. 1, No. 2, pp. 38–39, August 1958.

Center et al.: Core Characteristics Indicator, I.B.M. Tech. Disc. Bull., vol. 2, No. 4, p. 139, December 1959.

Dawley, R.: Magnetic Core Evaluation System, I.B.M. Tech. Disc. Bull., vol. 2, No. 6, p. 126, April 1960.

WILLIAM F. LINDQUIST, Primary Examiner

R. J. CORCORAN, Assistant Examiner

U.S. Cl. X.R.

340—174